(12) United States Patent
Barlas et al.

(10) Patent No.: US 12,476,046 B2
(45) Date of Patent: Nov. 18, 2025

(54) ELECTRONIC DEVICE

(71) Applicant: STMicroelectronics (Crolles 2) SAS, Crolles (FR)

(72) Inventors: Marios Barlas, Grenoble (FR); Yannick Le Friec, Goncelin (FR); Xavier Federspiel, Bernin (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 148 days.

(21) Appl. No.: 18/176,190

(22) Filed: Feb. 28, 2023

(65) Prior Publication Data

US 2023/0290570 A1  Sep. 14, 2023

(30) Foreign Application Priority Data

Mar. 9, 2022  (FR) .................................. 2202040
Mar. 9, 2022  (GR) .............................. 20220100222

(51) Int. Cl.
| | |
|---|---|
| *H01G 4/008* | (2006.01) |
| *H01G 4/012* | (2006.01) |
| *H01G 4/228* | (2006.01) |
| *H01G 4/30* | (2006.01) |
| *H01G 4/33* | (2006.01) |

(52) U.S. Cl.
CPC ............. *H01G 4/008* (2013.01); *H01G 4/012* (2013.01); *H01G 4/228* (2013.01); *H01G 4/306* (2013.01); *H01G 4/33* (2013.01)

(58) Field of Classification Search
CPC ........ H01G 4/008; H01G 4/012; H01G 4/228; H01G 4/306; H01G 4/33
See application file for complete search history.

(56) References Cited

U.S. PATENT DOCUMENTS

| | | | |
|---|---|---|---|
| 2005/0275005 A1 | 12/2005 | Choi et al. | |
| 2006/0024902 A1 | 2/2006 | Ajmera et al. | |
| 2008/0128856 A1* | 6/2008 | Kwak | ..................... H01L 28/75 257/532 |
| 2013/0034957 A1* | 2/2013 | Miyata | ................. H10B 12/315 257/E21.577 |
| 2019/0267383 A1 | 8/2019 | Rocklein et al. | |
| 2021/0005381 A1* | 1/2021 | Lu | ............................. H01G 4/33 |
| 2021/0057469 A1* | 2/2021 | Huang | .................... H10F 39/18 |
| 2022/0052173 A1* | 2/2022 | More | .................. H10D 64/661 |
| 2022/0399456 A1* | 12/2022 | Kim | .................. H01L 21/28568 |

* cited by examiner

*Primary Examiner* — Michael P Mcfadden
(74) *Attorney, Agent, or Firm* — Seed Intellectual Property Law Group LLP

(57) ABSTRACT

A device includes a first layer, having a copper track located therein. The first layer is covered with a second layer including a cavity. The cavity exposes at least a portion of the track. The portion is covered with a third layer of titanium nitride doped with silicon.

16 Claims, 5 Drawing Sheets

ELECTRONIC DEVICE

BACKGROUND

Technical Background

The present disclosure generally concerns electronic devices and their manufacturing methods, and more precisely devices including copper connection elements.

Description of the Related Art

Many electronic devices include copper connection elements, for example, conductive tracks or connection pads.

The copper elements are covered with protective materials, for example, conductive materials with which an electric connection is formed. Defects in the protection layers risk causing gas infiltrations in contact with the copper and the corrosion, for example, the galvanic corrosion, of the copper. The copper elements thus risk being emptied.

BRIEF SUMMARY

An electronic circuit in accordance with an embodiment overcomes all or part of the disadvantages of known electronic circuits including copper elements.

An embodiment provides a device including a first layer, having a copper track located therein, the first layer being covered with a second layer including a cavity, the cavity exposing at least a portion of the track, the portion being covered with a third layer of titanium nitride doped with silicon.

Another embodiment provides a method of manufacturing a device. The method includes forming a first layer, having a copper track located therein, forming a second layer covering the first layer and including a cavity exposing at least a portion of the track, and forming a third titanium nitride layer doped with silicon covering the portion.

According to an embodiment, the silicon concentration in the titanium nitride is lower than 20%.

According to an embodiment, the third layer further covers the lateral walls of the cavity.

According to an embodiment, the third layer is covered with a fourth insulating layer and the fourth layer is covered with a fifth insulating layer.

According to an embodiment, the third, fourth, and fifth layers form a capacitor.

According to an embodiment, forming the third layer is followed by forming the fourth layer by conformally forming the fourth layer on the second layer and on the walls and the bottom of the cavity.

According to an embodiment, forming the fourth layer is followed by conformally forming the fifth layer on the fourth layer.

According to an embodiment, the device includes a plurality of cavities, the fourth and fifth layers being common to all cavities.

According to an embodiment, the third layers are coupled together.

According to an embodiment, forming the third layer is carried out by an atomic layer method.

BRIEF DESCRIPTION OF THE SEVERAL VIEWS OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

Unless specified otherwise, where reference is made to a conductive element or material, there is meant electrically conductive. Similarly, when reference is made to an insulating element or material, there is meant electrically insulating.

In the following disclosure, unless otherwise specified, when reference is made to absolute positional qualifiers, such as the terms "front," "back," "top," "bottom," "left," "right," etc., or to relative positional qualifiers, such as the terms "above," "below," "upper," "lower," etc., or to qualifiers of orientation, such as "horizontal," "vertical," etc., reference is made to the orientation shown in the figures.

Unless specified otherwise, the expressions "around," "approximately," "substantially" and "in the order of" signify within 10%, and preferably within 5%.

Figure 1A:
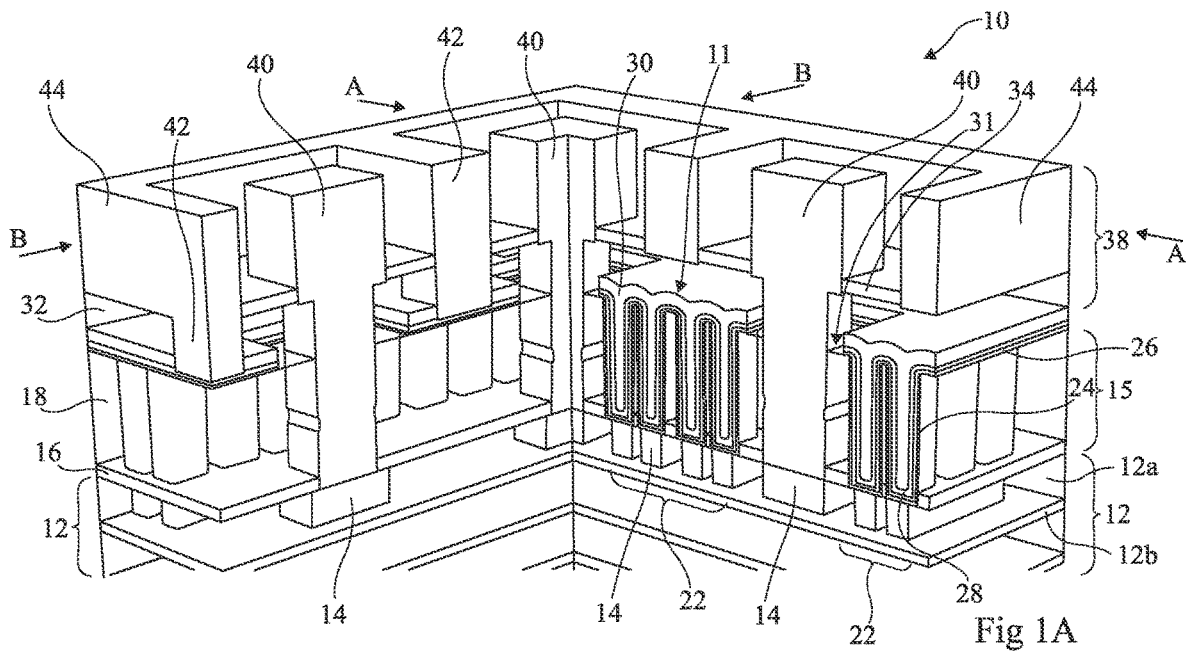
FIG. 1A shows a perspective view of an electronic device, according to an embodiment.
Figure 1B:
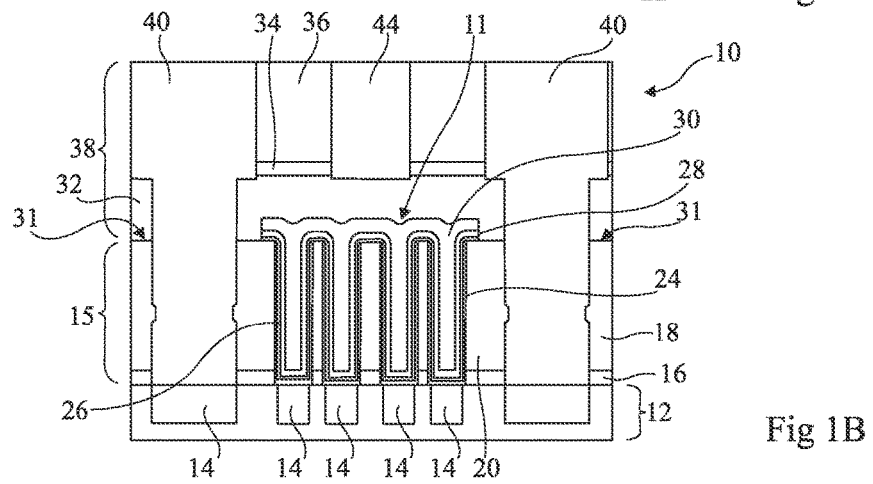
FIG. 1B shows a cross-section view of the electronic device of FIG. 1A, according to an embodiment.
Figure 1C:
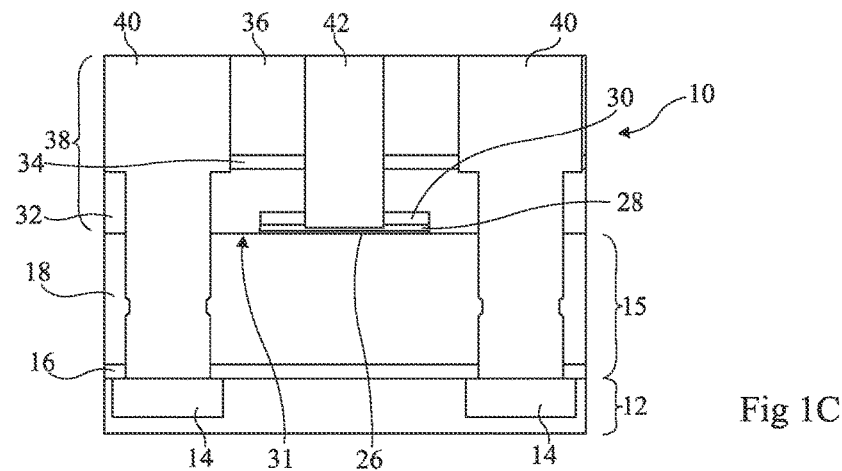
FIG. 1C shows a cross-section view of the electronic device of FIG. 1A, according to an embodiment.

FIGS. 1A, 1B, and 1C show an embodiment of an electronic device 10, including at least one capacitor 11, including in the example of FIGS. 1A, 1B, and 1C, a single capacitor 11. More precisely, FIG. 1A shows a perspective view of device 10. FIG. 1B shows a cross-section view of device 10 along a plane A-A. FIG. 1C shows a cross-section view of device 10.

The device 10 includes a substrate, or support, 12. The support 12 is for example a stack of insulating layers 12a and 12b. For example, stack 12 includes an alternation of layers 12a and 12b. Layers 12a are for example silicon oxide layers. Layers 12b are for example silicon nitride layers.

At least some of the layers of support 12 include copper conductive tracks 14. In particular, in the example of FIGS. 1A, 1B, and 1C, tracks 14 are located in the top layer of the support, that is, the layer closest to capacitor 11. The tracks 14 of said top layer are preferably located to be flush with the upper surface of the top layer of support 12.

Support 12, in particular the upper surface of the top layer of support 12, is for example covered with a stack 15 of insulating layers. Stack 15 includes, in the example of FIGS. 1A, 1B, and 1C, an insulating layer 16 and an insulating layer 18. Layer 16 is for example made of silicon nitride. Layer 16 is for example made of the same material as layers 12b. Layer 18 is for example made of silicon oxide. Layer 18 is for example made of the same material as layers 12a.

Layer 16 is the bottom layer of stack 15. Layer 18 is the top layer of stack 15. Layer 16 is for example in contact with the upper surface of the top layer of support 12. Layer 18 is for example in contact with the upper surface of layer 16.

Stack 15 is crossed by at least one opening, or cavity, 20, preferably by a plurality of openings 20. In the example of FIGS. 1A, 1B, and 1C, stack 15 includes a plurality of lines of openings 20. Said lines of openings 20 extend in the direction orthogonal to the cross-section plane of FIG. 1B. For example, stack 15 includes groups 22 of lines of openings 20. In the example of FIGS. 1A, 1B, and 1C, each group 22 includes 4 lines of openings 20. The lines of openings 20 of a same group 22 are for example separated from one another by substantially the same distance. In other words, each line of a group 22 is separated from the neighboring lines of a same group by the same distance. The distances separating the lines of openings 20 of a group 22 are for example substantially equal in all groups 22. The groups 22 are for example all separated from one another by a same distance. The distance separating each group 22 is preferably greater than the distance separating the lines of a same group 22.

Each opening 20 crosses stack 15, that is, in the example of FIGS. 1A, 1B, and 1C, layers 16 and 18. In other words, openings 20 extend from the upper surface of layer 18 to the lower surface of layer 16. Each opening 20 extends to expose at least one track 14.

Each opening 20 for example has a height, corresponding to the sum of the thicknesses of layers 16 and 18, for example in the range from 0.5 to 1.5 μm, for example substantially equal to 1 μm. The horizontal dimensions of each opening 20, that is, the dimensions in the plane of the upper surface of layer 18, are for example in the range from 50 nm to 150 nm, for example substantially equal to 100 nm.

Capacitor 11 includes layers 24. Each layer 24 is located in an opening 20. Each opening 20 includes a layer 24. There thus preferably are as many layers 24 as openings 20.

Each layer 24 covers the lateral walls of the opening 20 in which it is located, in other words, the walls of layers 16 and 18 located at the level of the opening. Each layer 24 covers the portion of support 12 exposed by the opening in which it is located. In other words, each layer 24 covers the portion of track 14 exposed by the opening in which it is located and possibly a portion of the layer 12a in which track 14 is located. All the portions of tracks 14 exposed by openings 20 are covered with a layer 24. Preferably, layer 24 does not extend outside of opening 20. Thus, layer 24 preferably does not extend on the lower and upper walls of the layers of stack 15.

Each layer 24 is made of silicon-doped titanium nitride. Preferably, the silicon content in the material of each layer 24 is preferably lower than 20%, for example in the range from 10% to 20%.

The layers 24 of capacitor 11 are electrically coupled to one another by tracks 14 of support 12. Layers 24 form a first electrode of capacitor 11.

Capacitor 11 further includes a layer 26. Layer 26 is an insulating layer. Layer 26 is for example made of an oxide, for example, of hafnium oxide ($HfO_2$). As a variant, layer 26 is for example a stack of layers. Said stack includes for example three layers. Said stack for example includes an aluminum oxide layer ($Al_2O_3$) between two hafnium oxide ($HfO_2$) or zirconium oxide ($ZrO_2$) layers. The aluminum oxide layer for example has a thickness in the range from 1.5 nm to 5 nm, preferably substantially equal to 3.5 nm. The hafnium oxide or zirconium oxide layers for example each have a thickness in the range from 3 nm to 8 nm, preferably substantially equal to 4 nm.

Layer 26 covers, preferably entirely, layers 24. Layer 26 for example covers at least a portion of the upper surface of layer 18. Preferably, the portions of layer 26 located in openings 20, that is, the portions covering layers 24, are coupled to one another by portions of layer 26 located on the upper surface of layer 18.

Capacitor 11 further includes a conductive layer 28, for example, made of metal. Layer 28 is for example made of titanium nitride. Layer 28 forms the second electrode of capacitor 11.

Layer 28 covers, preferably entirely, layer 26. Layer 28 thus extends on the portions of layer 26 covering the walls of openings 20, on the portions of layer 26 covering the exposed portions of tracks 14 and of stack 12, and on the portions of layer 26 covering the upper surface of layer 18. Preferably, layer 28 only covers layer 26. Thus, layer 28 is preferably not in contact with layer 18.

Device 10 further includes a layer 30. Layer 30 is made of an insulating material, for example, of a nitride, for example, of a silicon nitride. Layer 30 covers, preferably entirely, layer 28. Layer 30 thus extends on the portions of layer 28 covering the walls of openings 20, on the portions of layer 28 covering the exposed portions of tracks 14 and of stack 12, and on the portions of layer 28 covering the upper surface of layer 18. Preferably, layer 30 only covers layer 28. Thus, layer 30 is preferably not in contact with layer 18 or with layers 24.

Preferably, portions 31 of layer 18 are not covered with layers 26, 28, 30. Portions 31 are preferably at least partially in front of tracks 14.

The device includes a stack 38 of insulating layers 32, 34, and 36. Layer 32 forms the bottom layer of stack 38. Layer 36 forms the top layer of stack 38. Layer 34 forms an internal or intermediate layer of stack 38.

Layer 32 rests on layer 18, on capacitor 11, and on layer 30. In other words, at least a portion of layer 18 is covered with, preferably in contact with, the upper surface of layer 32. The upper surface of layer 30 is covered with, preferably in contact with, layer 32. Preferably, the upper surface of layer 30 is entirely covered with, preferably in contact with, layer 32. The lateral walls of the portions of layers 26, 28, 30 resting on the upper surface of layer 18 are covered with, preferably in contact with, layer 32.

Layer 34 rests on the upper surface of layer 32. Layer 34 is for example in contact with the upper surface of layer 32.

Layer 36 rests on the upper surface of layer 34. Layer 36 is for example in contact with the upper surface of layer 34.

Layer 32 is for example made of an oxide, for example of silicon oxide. Layer 34 is for example made of a nitride, for example of silicon nitride. Layer 36 is for example made of an oxide, for example of silicon oxide.

Device 10 includes connection elements, or connection pads, 40. Elements 40 are for example made of metal, for example, copper. Elements 40 cross layers 16, 18, 32, 34, and 36 to reach tracks 14, preferably the tracks 14 located in the top layer of stack 12. Preferably, each element 42 is in contact with a portion of layer 28 located on the upper surface of layer 18, preferably between two groups of lines of openings 20. Elements 40 are for example coupled together and to layers 24 by conductive tracks 14. Elements 40 are thus coupled to the first electrode of capacitor 11.

Device 10 includes connection elements 42. Elements 42 are for example made of metal, for example of copper. Elements 42 are in contact with layer 28. More precisely, each element 42 crosses layers 30, 32, 34, and 36 to reach layer 28. Preferably, each element 42 is in contact with a portion of layer 28 located on the upper surface of layer 18, preferably between two groups of lines of openings 20. Elements 42 are thus coupled to the second electrode of capacitor 11.

Elements 42 are for example coupled together by tracks 44. Tracks 44 are for example made of metal, for example of copper. Tracks 44 extend in layers 34 and 36. For example, tracks 44 extend from the lower surface of layer 34 to the upper surface of layer 36.

The inventors have proven that the presence of titanium nitride doped with silicon, with a dopant concentration such as previously described, in particular when the deposition is performed by an atomic layer deposition or ALD method, enables to improve the robustness of the interface between the copper and the titanium nitride. Further, such a structure enables to better isolate the copper from oxidizing sources. Thus, the risk of forming of copper extrusions is decreased with respect to a structure where the titanium nitride is not doped with silicon.

FIGS. 2 to 8 illustrate steps, preferably successive, of a method of manufacturing an embodiment of the device of FIGS. 1A, 1B, and 1C.

Figure 2:
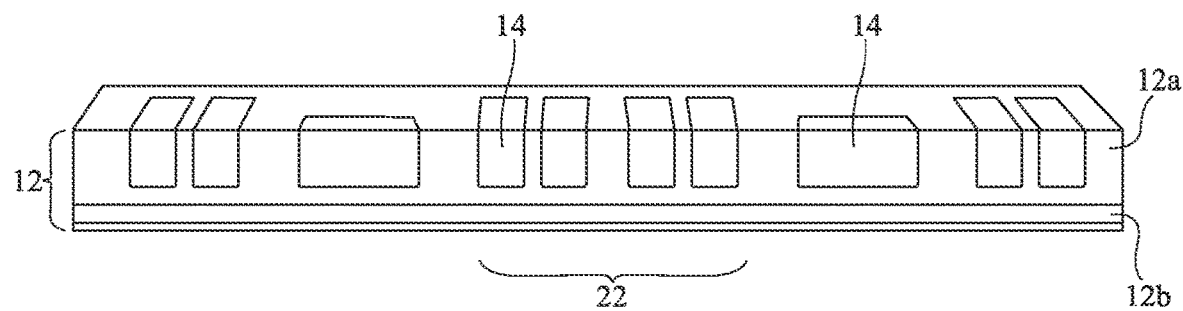
FIG. 2 shows a step of a method of manufacturing the embodiment of FIGS. 1A, 1B, and 1C, according to an embodiment.

FIG. 2 illustrates a step of a method of manufacturing the embodiment of FIGS. 1A, 1B, and 1C.

During this step, stack 12 and tracks 14 are formed. In other words, layers 12a and 12b are formed on one another to obtain an alternation of layers 12a and 12b. Preferably, the top layer of stack 12 is a layer 12a.

Tracks 14 are formed in layers 12a. The tracks 14 of each layer 12a are for example formed on forming of layer 12a.

Figure 3:
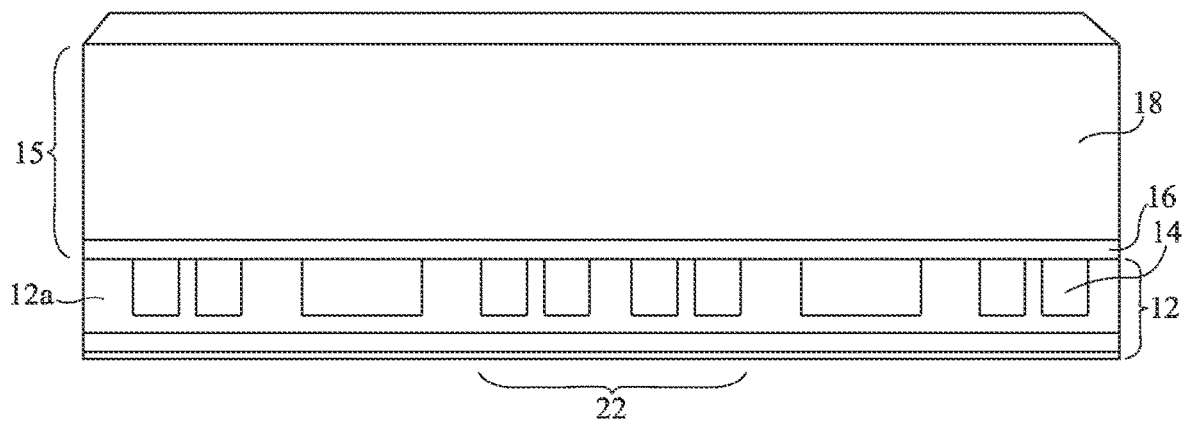
FIG. 3 shows another step of a method of manufacturing the electronic device of FIGS. 1A, 1B, and 1C, according to an embodiment.

FIG. 3 shows another step of a method of manufacturing the embodiment of FIGS. 1A, 1B, and 1C.

During this step, stack 15 is formed. In other words, layer 16 is formed on, preferably in contact with, the upper surface of the top layer 12a of stack 12 and on, preferably in contact with, the upper surfaces of tracks 14 flush with the upper surface of the top layer 12a of stack 12. Preferably, layer 16 is formed over the entire upper surface of the top layer 12a of stack 12 and on all the upper surfaces of tracks 14 flush with the upper surface of the top layer 12a of stack 12.

Further, layer 18 is formed on, preferably in contact with, layer 16. Preferably, layer 18 covers, preferably is in contact with, the entire layer 16, more precisely the entire upper surface of layer 16.

Figure 4:
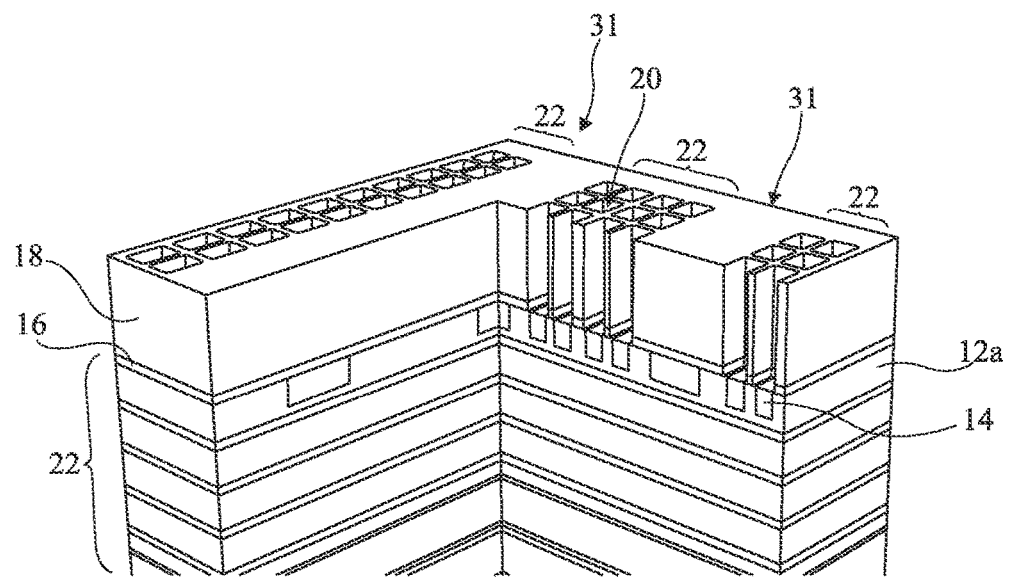
FIG. 4 shows another step of a method of manufacturing the electronic device of FIGS. 1A, 1B, and 1C, according to an embodiment.

FIG. 4 shows another step of a method of manufacturing the embodiment of FIGS. 1A, 1B, and 1C.

During this step, openings 20 are formed in layers 14 and 16. More precisely, the groups 22 of lines of openings 20 are formed in layers 16 and 18. Each opening 20 exposes a portion of a conductive track 14, preferably a conductive track 14 located in the top layer 12a of stack 12. Preferably, all the tracks 14 having a portion exposed by openings 20 are coupled together, for example by tracks 14 located inside of one or a plurality of layers of stack 12.

Figure 5:
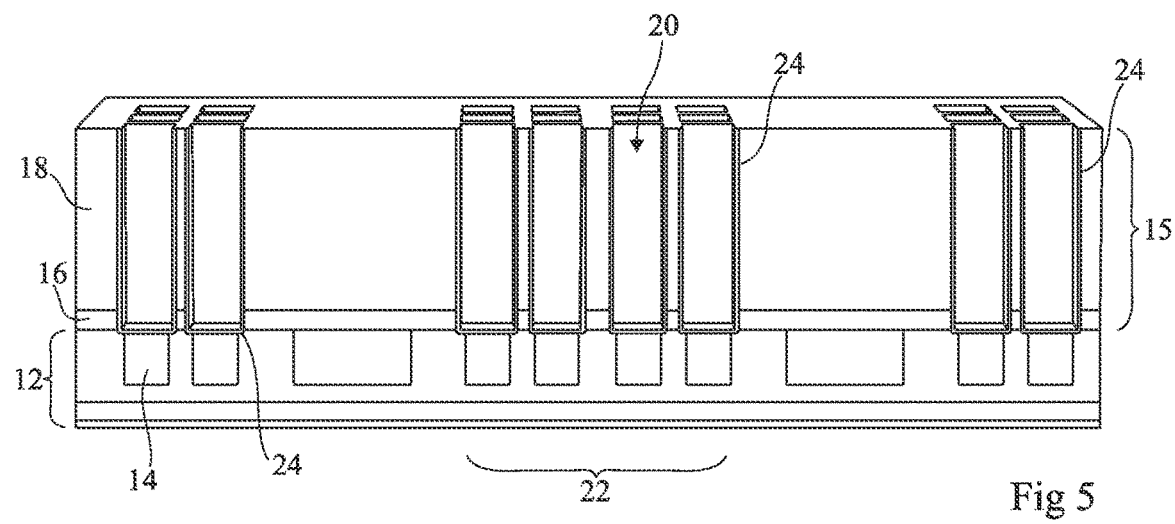
FIG. 5 shows another step of a method of manufacturing the electronic device of FIGS. 1A, 1B, and 1C, according to an embodiment.

FIG. 5 shows another step of a method of manufacturing the embodiment of FIGS. 1A, 1B, and 1C.

During this step, layers 24 are formed. More precisely, a layer 24 is formed in each opening 20.

For example, the forming of layers 24 includes the forming of a layer, not shown, made of the material of layers 24. Said layer is formed to have a thickness substantially equal to the thickness of layers 24. Said layer is formed conformally on the structure resulting from the step of FIG. 4. Said layer covers the walls and the bottom of the cavities formed by openings 20. In particular, the portion of a track 14 located at the bottom of the cavity is entirely covered with layer 24. Thus, tracks 14 are entirely covered with layer 18 or layers 24.

Layer 24 is preferably formed by an atomic layer deposition or ALD method. Such a method enables to deposit layers having thicknesses of a few nanometers by using gas, which enables to form conformal layers entirely covering the expose surfaces. In particular, it is thus possible to entirely cover the exposed portions of tracks 14. Further, such a method allows a good control of the dopant concentration and may be used in "back end"-type methods. The portions of said layer located outside of openings 20 are then removed.

Figure 6:
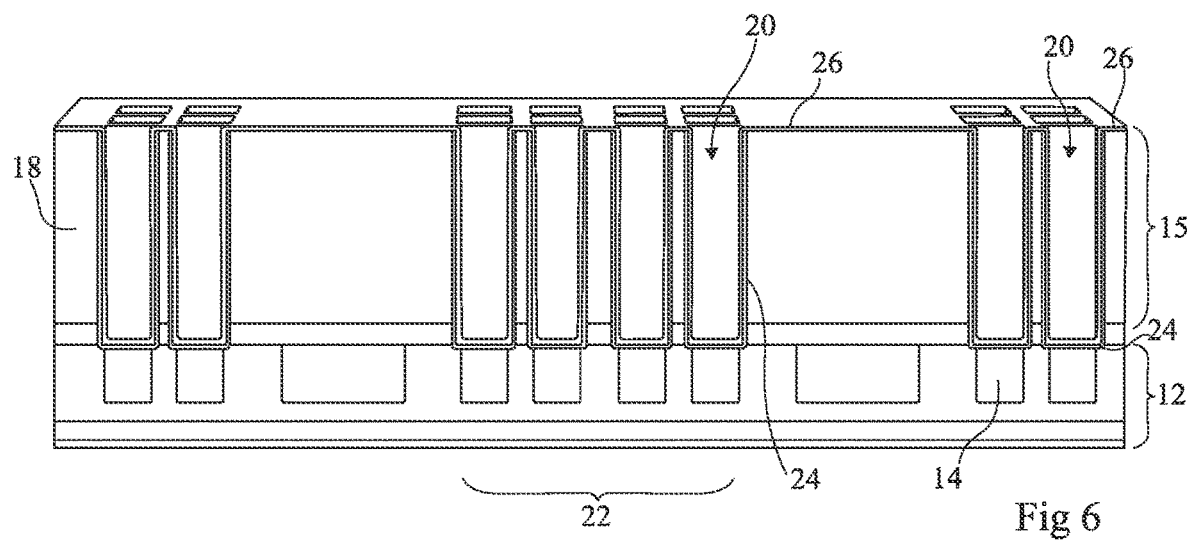
FIG. 6 shows another step of a method of manufacturing the electronic device of FIGS. 1A, 1B, and 1C, according to an embodiment.

FIG. 6 shows another step of a method of manufacturing the embodiment of FIGS. 1A, 1B, and 1C.

During this step, layer 26 is formed. More precisely, layer 26 is conformally formed over the entire structure resulting from the step of FIG. 5. Layer 26 covers layers 24. In other words, layer 26 extends on the walls and the bottom of the cavity formed by each opening 20. Layer 26 further extends on the upper surface of layer 18.

Figure 7:
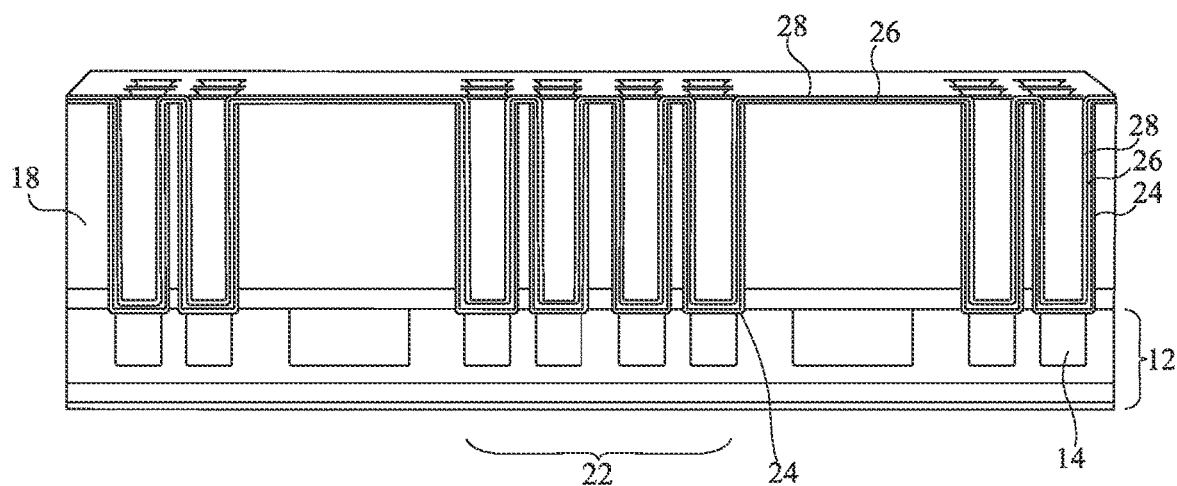
FIG. 7 shows another step of a method of manufacturing the electronic device of FIGS. 1A, 1B, and 1C, according to an embodiment.

FIG. 7 shows another step of a method of manufacturing the embodiment of FIGS. 1A, 1B, and 1C.

During this step, layer 28 is formed. More precisely, layer 28 is formed conformally over the entire structure resulting from the step of FIG. 6. Layer 28 covers layer 26. Thus, layer 28 extends on the walls and the bottom of the cavity formed by each opening, as well as the upper surface of layer 18.

Capacitor 11 is thus formed. Capacitor 11 includes a first electrode formed by layers 24, a second electrode formed by layer 26. The two electrodes are separated by insulating layer 28.

Figure 8:
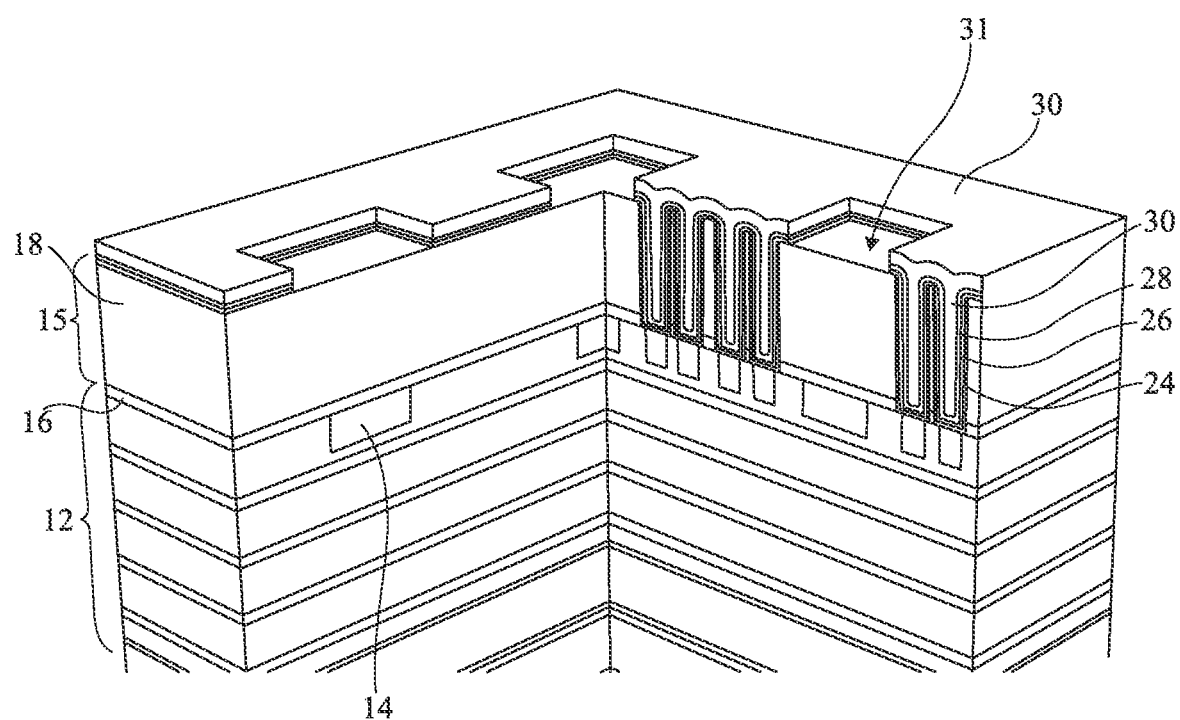
FIG. 8 shows another step of a method of manufacturing the electronic device of FIGS. 1A, 1B, and 1C, according to an embodiment.

FIG. 8 shows another step of a method of manufacturing the embodiment of FIGS. 1A, 1B, and 1C.

During this step, layer 30 is formed over the entire structure resulting from step 7. Layer 30 is for example sufficiently thick to fill openings 20.

The stack of layers 26, 28, and 30 is then etched at the level of locations 31. In other words, a portion of the stack of layers 26, 28, and 30 is etched between each group 22 of lines of openings 20. Thus, at the level of locations 31, layers 26, 28, and 30 are etched to expose layer 18.

The portions of layer 30 located in front of the openings or in the openings are not etched.

Each of locations 31 is located in front of a track 14. Said tracks 14 are preferably coupled together. Said tracks 14 are preferably not coupled to the tracks 14 being in contact with layers 24.

The method of manufacturing the embodiment of FIG. 1 includes steps subsequent to the step of FIG. 8. During this step, the stack 38 of insulating layers is formed on the structure resulting from the step of FIG. 8 and connection elements 40, 42, and 44 are formed.

Figure 9:
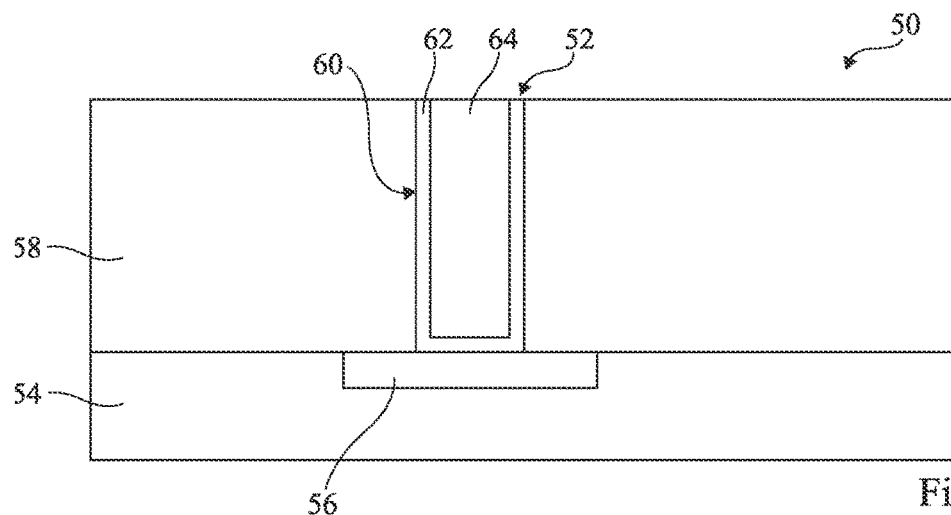
FIG. 9 shows an electronic device, according to an embodiment.

FIG. 9 shows another embodiment of an electronic device 50 including a conductive via 52.

Device 50 includes a support 54. Support 54 for example includes an insulating layer. Support 54 corresponds to a stack of insulating layers such as the stack 12 of FIG. 1.

Insulating layer 54 includes at least one copper track 56. Track 56 is for example coupled to other conductive tracks or elements, not shown. Via 52 is located in front of track 56. Track 56 is for example located to be flush with an upper surface of layer 54.

Layer 54, and in particular the upper surface of layer 54, is covered with an insulating layer 58. Preferably, layer 54 is entirely covered with layer 58. Preferably, track 56 is partially covered with layer 58.

Layer 58 includes a cavity 60. Cavity 60 crosses layer 58. In other words, cavity 60 extends from the upper surface of layer 58 to the lower surface of layer 58, that is, the plane of the upper surface of layer 54. The bottom of cavity 60 is at least partially formed of a portion of track 56.

The walls and the bottom of cavity 60 are covered with a layer 62. Layer 62 is thus in contact with the portion of track 56 forming a portion of the bottom of cavity 60. The portion of track 56 at the bottom of cavity 60 is entirely covered with layer 62. Preferably, layer 62 extends only inside of cavity 60. Thus, layer 62 for example does not extend over the upper surface of layer 58.

Layer 62 is made of silicon-doped titanium nitride. Preferably, the silicon content in the material of layer 62 is preferably lower than 20%, for example, in the range from 10% to 20%.

The rest of cavity 60 includes an element 64. Element 64 is for example made of the same material as layer 64, of another conductive material, or of an insulating material, for example, air.

The upper surface of the portions of layer 62 covering the lateral walls of cavity 600 are preferably exposed, to be able to be in contact with a conductive element. Thus, the plane of the upper surface of layer 58 includes, in addition to the upper surface of layer 58, the upper surfaces of the portions of layer 62 covering the lateral walls of cavity 60 and the upper surface of element 64.

Figure 10:
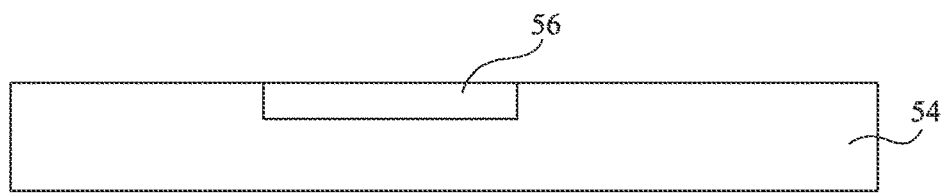
FIG. 10 shows a step of a method of manufacturing the electronic device of FIG. 9, according to an embodiment.

FIG. 10 shows a step of a method of manufacturing the embodiment of FIG. 9.

During this step, layer 54 is formed and track 54 is formed in said layer 54.

For example, a cavity is formed in layer 54 at the location of track 56, for example, by etching. Said cavity is then filled with copper, for example, by a damascene-type method.

Figure 11:
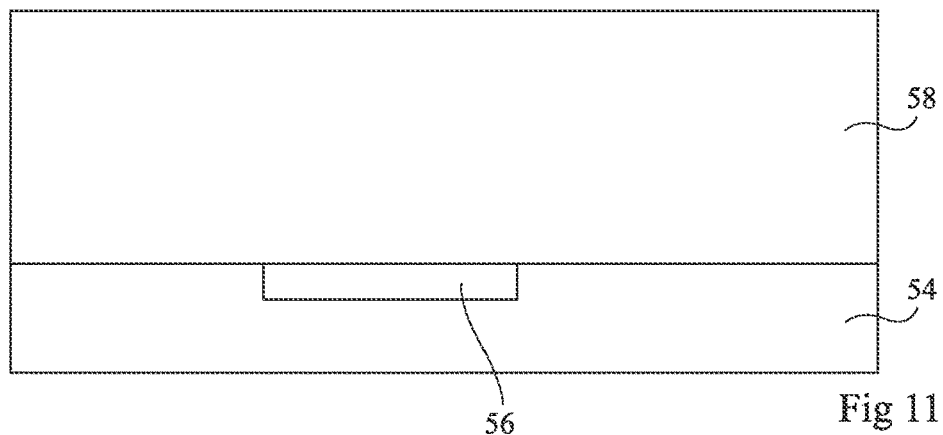
FIG. 11 shows another step of a method of manufacturing the electronic device of FIG. 9, according to an embodiment.

FIG. 11 shows another step of a method of manufacturing the embodiment of FIG. 9.

During this step, insulating layer 58 is formed on the structure resulting from the step of FIG. 10. In particular, layer 58 covers, preferably entirely, track 56. Preferably, layer 58 entirely covers layer 54 and track 56.

Figure 12:
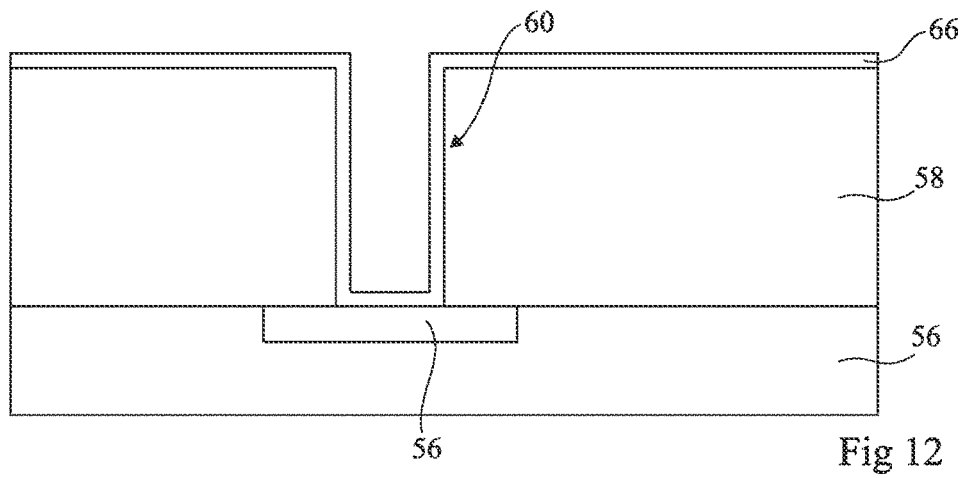
FIG. 12 shows a step of a method of manufacturing the electronic device of FIG. 9, according to an embodiment.

FIG. 12 shows a step of a method of manufacturing the embodiment of FIG. 9.

During this step, cavity 60 is formed in layer 58. Cavity 60 is formed to expose at least partially track 56.

A layer 66 made of the material of layer 62 is formed conformally on the structure. Said layer is formed to have a thickness substantially equal to the thickness of layers 24. Layer 66 covers the walls and the bottom of cavity 60. In particular, the portion of track 56 located at the bottom of cavity 60 is entirely covered with layer 66. Thus, track 56 is entirely covered with layer 58 or layer 66.

Layer 66 is preferably formed by an atomic layer deposition or ALD method. Such a method enables to deposit layers having thicknesses of a few nanometers by using gas, which enables to form conformal layers entirely covering the exposed surfaces. In particular, it is thus possible to entirely cover the exposed portion of track 56. Further, such a method allows a good control of the dopant concentration and may be used in "back end"-type methods.

The method of manufacturing the device of FIG. 9 then includes the removal of the portions of said layer located outside of openings 20. Cavity 60 is for example then filled with element 64.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereabove.

In one embodiment, a device may be summarized as including a first layer having a copper track located therein. The first layer is covered with a second layer including a cavity exposing at least a portion of the track. The portion is covered with a third layer of titanium nitride doped with silicon.

In one embodiment, a method of manufacturing a device may be summarized as including forming a first layer having a copper track located therein. The method includes forming a second layer covering the first layer and including a cavity exposing at least a portion of the track. The method includes forming a third layer of titanium nitride doped with silicon covering the portion.

The silicon concentration in the titanium nitride may be lower than 20%.

The third layer may further cover the lateral walls of the cavity.

The third layer may be covered with a fourth insulating layer and the fourth layer may be covered with a fifth conductive layer.

The third, fourth, and fifth layers may form a capacitor.

Forming the third layer may be followed by conformally forming the fourth layer on the second layer and on the walls and the bottom of the cavity.

Forming the fourth layer may be followed by conformally depositing the fifth layer on the fourth layer.

The device may include a plurality of cavities. The fourth and fifth layers may be common to all the cavities.

The third layers may be coupled together.

Forming the third layer may be carried out by an atomic layer method.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a first layer;
   a plurality of copper tracks located in the first layer;
   a second layer covering the first layer and including a plurality of cavities each exposing at least a portion of a respective track; and
   a third layer of titanium nitride doped with silicon lining sidewalls of each cavity, on a top surface of the second layer between the cavities, and covering the exposed portion of each track, silicon concentration in the third layer being in a range from 10% to 20%.

2. The device of claim 1, comprising a fourth layer of dielectric material on the third layer in the cavities and over the top surface of the second layer between the cavities.

3. The device of claim 2, comprising a fifth layer of conductive material on the third layer in the cavities and over the top surface of the second layer between the cavities.

4. The device of claim 3, comprising a sixth layer of dielectric material on the fifth layer.

5. The device of claim 4, comprising a first conductive via extending through the sixth layer and contacting the fifth layer of conductive material.

6. The device of claim 5, comprising:
   a conductive structure in the first layer electrically connected to the tracks; and
   a second conductive via extending through the sixth layer and the second layer and contacting the conductive structure.

7. A device, comprising:
   a first layer of insulating material having a plurality of copper tracks located therein;
   a second layer of insulating material on the first layer;
   a third layer of insulating material on the second layer;
   a plurality of cavities extending into a surface of the third layer and through the third layer and the second layer, each the plurality of cavities exposing a respective copper track; and
   a fourth layer of titanium nitride doped with silicon in each of the plurality of cavities and contacting a respective copper track, portions of the surface of the third layer between the plurality of cavities being exposed by the fourth layer in each of the plurality of cavities;
   a fifth layer of insulating material on the fourth layer, in the plurality of cavities, cavity, and on the surface of the third layer;
   a sixth layer of conductive material on the fifth layer, in the plurality of cavities, cavity, and on the surface of the third layer; and
   a seventh layer of insulating material on the sixth layer, in the plurality of cavities, cavity, and on the surface of the third layer.

8. The device of claim 7, wherein silicon concentration in the titanium nitride is lower than 20%.

9. The device of claim 7, wherein the fourth layer covers lateral walls of each of the plurality of cavities.

10. The device of claim 7, wherein the fourth, fifth, and sixth layers form a capacitor.

11. The device of claim 10, wherein the fifth layer is on the third layer and on lateral walls and bottoms of each of the plurality of cavities.

12. A device, comprising:
    a first insulating layer;
    a plurality of conductive tracks in the first insulating layer, the plurality of conductive tracks including copper;
    a second insulating layer on the first insulating layer;
    a third insulating layer on the second insulating layer;
    a plurality of cavities in the second insulating layer and the third insulating layer, each of the plurality of cavities exposing a respective conductive track;
    a plurality of first electrodes of a capacitor in the plurality of cavities, respectively, the plurality of first electrodes including silicon-doped titanium nitride, each of the plurality of first electrodes in contact with a respective conductive track, the plurality of first electrodes exposing top surfaces of the third insulating layer between the plurality of cavities;
    an insulator of the capacitor on the plurality of first electrodes, in the plurality of cavities, and on the top surfaces of the third insulating layer between the plurality of cavities; and
    a second electrode of the capacitor on the insulator, in the plurality of cavities, and on the top surfaces of the third insulating layer between the plurality of cavities; and
    a fourth insulating layer on the second electrode, in the plurality of cavities, and on the top surfaces of the third insulating layer between the plurality of cavities.

13. The device of claim 12, wherein silicon concentration of silicon-doped titanium nitride in the plurality of first electrodes is lower than 20%.

14. The device of claim 12, wherein the plurality of first electrodes are on sidewalls of the plurality of cavities.

15. The device of claim 14, wherein the insulator and the second electrode are on the sidewalls of the plurality of cavities.

16. The device of claim 12, wherein
    the plurality of cavities including a first group of cavities and a second group of cavities that are spaced from each other by portions of the second and third insulating layers,
    the device includes an opening extending through the fourth insulating layer, the second electrode of the capacitor, and the insulator of the capacitor, and
    the opening is positioned between the first group of cavities and the second group of cavities and exposes the third insulating layer.

* * * * *

UNITED STATES PATENT AND TRADEMARK OFFICE
CERTIFICATE OF CORRECTION

PATENT NO. : 12,476,046 B2  
APPLICATION NO. : 18/176190  
DATED : November 18, 2025  
INVENTOR(S) : Marios Barlas et al.

Page 1 of 1

It is certified that error appears in the above-identified patent and that said Letters Patent is hereby corrected as shown below:

In the Claims

<u>Column 9, Claim 7, Line 60:</u>
"cavities, cavity, and" should read: -- cavities, and --.

<u>Column 10, Claim 7, Line 2:</u>
"cavities, cavity, and" should read: -- cavities, and --.

<u>Column 10, Claim 7, Line 5:</u>
"cavities, cavity, and" should read: -- cavities, and --.

Signed and Sealed this  
Thirteenth Day of January, 2026

John A. Squires  
*Director of the United States Patent and Trademark Office*